(12) United States Patent
Bae

(10) Patent No.: US 10,506,009 B2
(45) Date of Patent: Dec. 10, 2019

(54) APPARATUS AND METHOD FOR PROVIDING CONTENT ON BASIS OF DASH ADAPTIVE TO BANDWIDTH

(71) Applicant: ELECTRONICS AND TELECOMMUNICATIONS RESEARCH INSTITUTE, Daejeon (KR)

(72) Inventor: Seong-Jun Bae, Daejeon (KR)

(73) Assignee: ELECTRONICS & TELECOMMUNICATIONS RESEARCH INSTITUTE, Daejeon (KR)

( * ) Notice: Subject to any disclaimer, the term of this patent is extended or adjusted under 35 U.S.C. 154(b) by 211 days.

(21) Appl. No.: 15/549,350

(22) PCT Filed: Sep. 1, 2015

(86) PCT No.: PCT/KR2015/009173
§ 371 (c)(1),
(2) Date: Aug. 7, 2017

(87) PCT Pub. No.: WO2016/129768
PCT Pub. Date: Aug. 18, 2016

(65) Prior Publication Data
US 2018/0027040 A1    Jan. 25, 2018

(30) Foreign Application Priority Data

Feb. 9, 2015  (KR) .......................... 10-2015-0019723

(51) Int. Cl.
*G06F 15/16*  (2006.01)
*H04L 29/06*  (2006.01)
(Continued)

(52) U.S. Cl.
CPC ............ *H04L 65/602* (2013.01); *H04L 65/80* (2013.01); *H04N 21/238* (2013.01);
(Continued)

(58) Field of Classification Search
CPC ............. H04N 21/238; H04N 21/2385; H04N 21/8456; H04N 21/23439;
(Continued)

(56) References Cited

U.S. PATENT DOCUMENTS

| 8,966,556 B2 | 2/2015 | Sharp et al. |
| 9,253,233 B2 | 2/2016 | Luby et al. |

(Continued)

FOREIGN PATENT DOCUMENTS

| KR | 10-2004-0003148 A | 1/2004 |
| KR | 10-2012-0035831 A | 4/2012 |

(Continued)

OTHER PUBLICATIONS

International Search Report for International Application No. PCT/KR2015/009173, filed on Sep. 1, 2015.

*Primary Examiner* — Ryan J Jakovac

(57) ABSTRACT

Disclosed is a technology for providing a content on the basis of DASH adaptive to a variable bandwidth. The present invention may comprise: a bandwidth measurement unit for measuring a bandwidth of a network connected to a terminal at predetermined time intervals; a segment generation unit for generating a plurality of segments, wherein the plurality of segments have a predetermined bitrate difference therebetween; and a media information generation unit for generating a media presentation description which includes information on the representation including the plurality of generated segments, wherein the segment generation unit calculates segment lengths using arithmetic operations on the predetermined time interval and the probability that an (Continued)

ith bandwidth itself among bandwidths of the network measured at the predetermined time intervals is increased or decreased by half of the predetermined bitrate difference, and generates a plurality of segments corresponding to the calculated lengths.

18 Claims, 4 Drawing Sheets

(51) Int. Cl.
*H04N 21/238* (2011.01)
*H04N 21/2385* (2011.01)
*H04N 21/845* (2011.01)
*H04N 21/2343* (2011.01)
*H04N 21/24* (2011.01)
*H04N 21/262* (2011.01)

(52) U.S. Cl.
CPC ... *H04N 21/2385* (2013.01); *H04N 21/23439* (2013.01); *H04N 21/2402* (2013.01); *H04N 21/26258* (2013.01); *H04N 21/8456* (2013.01); *H04L 65/604* (2013.01)

(58) Field of Classification Search
CPC ......... H04N 21/23655; H04N 21/2402; H04N 21/26216; H04N 21/26258; H04L 65/602; H04L 65/604; H04L 65/80
See application file for complete search history.

(56) References Cited

U.S. PATENT DOCUMENTS

| | | | |
|---|---|---|---|
| 9,635,076 B2 | 4/2017 | Rhyu et al. | |
| 2010/0002724 A1* | 1/2010 | Turlington | H04L 12/4633 370/468 |
| 2012/0042091 A1* | 2/2012 | McCarthy | H04N 7/17318 709/231 |
| 2013/0159546 A1 | 6/2013 | Thang et al. | |
| 2013/0238758 A1 | 9/2013 | Lee et al. | |
| 2013/0304933 A1 | 11/2013 | Kim et al. | |
| 2017/0111706 A1 | 4/2017 | Kim et al. | |

FOREIGN PATENT DOCUMENTS

| | | |
|---|---|---|
| KR | 10-2012-0083744 A | 7/2012 |
| KR | 10-2014-0031929 A | 3/2014 |
| KR | 10-2014-0038492 A | 3/2014 |
| KR | 10-2014-0039069 A | 3/2014 |
| KR | 10-2014-0054400 A | 5/2014 |
| KR | 10-2014-0066265 A | 5/2014 |

* cited by examiner

APPARATUS AND METHOD FOR PROVIDING CONTENT ON BASIS OF DASH ADAPTIVE TO BANDWIDTH

CROSS REFERENCE TO RELATED APPLICATIONS

This application is a U.S. National Stage of PCT/KR2015/009173 filed Sep. 1, 2015, which claims the priority benefit of Korean Patent Application No. 10-2015-0019723, filed on Feb. 9, 2015 in the Korean Intellectual Property Office, the disclosures of which are incorporated herein by reference.

TECHNICAL FIELD

The present invention relates to a technology for providing DASH (Dynamic Adaptive Streaming over HTTP)-based content, and more specifically, to a technology for providing DASH-based content that is adaptive to varying bandwidths.

BACKGROUND ART

Due to the recent explosive growth of high-definition content, a demand for more efficient use of a video streaming service and network is raised. Accordingly, in order to create a standard for adaptive streaming that uses HTTP, Dynamic Adaptive Streaming over HTTP (DASH) was developed in the Moving Picture Experts Group (MPEG) forum.

DASH is a technology that initially breaks up a content into segments, each segment having a certain bitrate, for which their corresponding representations each have different durations; and then, during streaming, transmits the segments encoded based on their respective bitrates, according to the network's measured bandwidth.

However, once the transmission of the selected segment has begun, even if there is a change in network bandwidth, another segment, which has been encoded at the bitrate that corresponds to the changed bandwidth, cannot be selected and transmitted. Only when a new representation begins, one of the segments, encoded at various bitrate and which is of said new representation can be selected and transmitted.

Furthermore, if the duration of the representation is long and the network environment thereof is one in which the bandwidth changes rapidly, content streaming that is adaptive to the bandwidth is difficult; however, if the duration of the representation is short and the network environment thereof is one in which the bandwidth changes slowly, an overhead is incurred due to the additional representation that is generated.

Technical Problem

The purpose of the present invention is to dynamically adjust the duration of representation, which includes segments that are each encoded at various bitrates according to the network bandwidth, thereby presenting an apparatus and method for providing streaming content adaptive to bandwidths.

Technical Solution

In one exemplary embodiment, an apparatus for providing dynamic adaptive streaming over HTTP (DASH)-based content includes: a bandwidth measurer to measure a bandwidth of a network connected to a terminal at a set time interval $T_{int}$; a segment generator to generate a plurality of segments included in a representation that divides content at one or more intervals, wherein the plurality of segments each have set bitrate differences Rg; and a media information generator to generate media information, also known as media presentation description (MPD), comprising information on the representation that comprises the plurality of generated segments, wherein the segment generator is configured to: calculate a duration of the segment by using four fundamental rules of arithmetic on: a probability P(i) of a network bandwidth B(i), measured for i-th time at the set time interval $T_{int}$, becoming bigger by or smaller by half of the set bitrate difference Rg; and the set time interval $T_{int}$; and generate the plurality of segments corresponding to the calculated duration of the segment.

The segment generator is configured to calculate a probability P(i) of a network bandwidth becoming bigger by or smaller by half of the set bitrate difference Rg, wherein the network bandwidth is measured at a certain point in time, i.e., a present point in time, which makes an i-th measurement of the bandwidth, by using Chebyshev's inequality.

The segment generator is configured to calculate a probability P(i) of a network bandwidth becoming bigger by or smaller by half of the set bitrate difference Rg, wherein the network bandwidth is measured at a certain point in time, i.e., a present point in time, which makes an i-th measurement of the bandwidth, by using four fundamental rules of arithmetic on an average $B_{avg}(i)$, variance V(i), and the set bitrate difference Rg, which have been measured i number of times at the set time interval $T_{int}$.

The segment generator is configured to: calculate an average of a number of measurement times through the probability P(i), wherein the average of a number of measurement times is average times it takes for a network bandwidth to become bigger by or smaller by half of the set bitrate difference Rg, wherein the network bandwidth is measured at a certain point in time, i.e., a present point in time, which makes an i-th measurement of the bandwidth; and calculate the duration of the segment by using four fundamental rules of arithmetic on the average of the number of measurement times and the interval time $T_{int}$.

The segment generator is configured to: calculate an average of a number of measurement times through the probability P(i), wherein the average of a number of measurement times is average times it takes for the network bandwidth B(i) to become bigger by or smaller by half of the set bitrate difference Rg, wherein the network bandwidth B(i) is measured at a certain point in time, i.e., a present point in time, which makes an i-th measurement of the bandwidth; and calculate the duration of the segment by multiplying the average of a number of measurement times and the set time interval $T_{int}$.

Additional features of the invention will be set forth in the description which follows, and in part will be apparent from the description, or may be learned by practice of the invention.

Advantageous Effects

The present invention may reduce the duration of a representation when said representation is in a network environment wherein the bandwidth changes rapidly, and then may select a segment which has been compressed at a bitrate that corresponds to the bandwidth at the time of streaming, thereby allowing for adaptive streaming of the content.

The present invention may lengthen the duration of a representation when said representation is in a network environment wherein the bandwidth changes slowly, thereby reducing the incurred overhead caused by the additional representation that is generated.

DESCRIPTION OF DRAWINGS

The accompanying drawings, which are included to provide a further understanding of the invention and are incorporated in and constitute a part of this specification, illustrate embodiments of the invention, and together with the description serve to explain the principles of the invention.

BEST MODE

Figure 1:
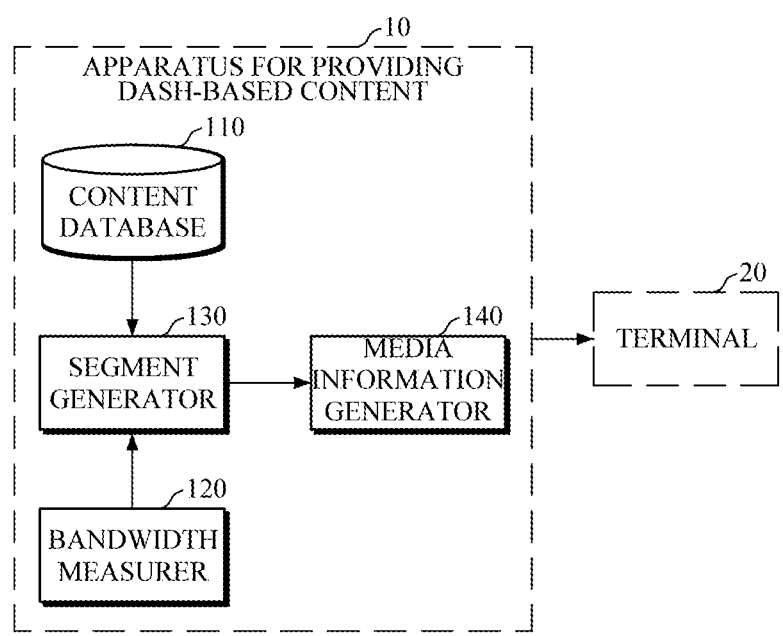
FIG. 1 is a diagram illustrating an example of an apparatus for providing Dynamic Adaptive Streaming over HTTP (DASH)-based content.

The above-mentioned and additional aspects of the present invention may be clearer through preferred embodiments, which are described with reference to attached figures. It will be understood that the elements in each exemplary embodiment may be combined in various forms in the same exemplary embodiment. Furthermore, the present invention may be implemented in various forms that are different from each other, which are not limited to exemplary embodiments described herein. Descriptions incorporated herein is omitted to enhance clarity and conciseness, and similar reference numerals are used to refer to similar elements, features, and structures throughout the drawings and the detailed description. The description that one portion 'comprises' one element does not indicate that other elements are excluded, but it indicates other elements are further included if there are not the descriptions against the present disclosure. In addition, the components, devices, and units described herein indicate "a block configured to enable the systems of hardware or software to be changed or plugged in", which is, in other words, one unit or block that performs functions in hardware or software.

FIG. 1 is a diagram illustrating an example of an apparatus 10 for providing Dynamic Adaptive Streaming over HTTP (DASH)-based content. According to an exemplary embodiment, the apparatus includes a bandwidth measurer 120, a segment generator 130, and a media information generator 140.

DASH is a standard for supporting adaptive streaming in a hypertext transfer protocol (HTTP) environment. That is, Dash delivers content from a HTTP server to a HTTP client and caches the content through standard HTTP caches.

In one exemplary embodiment, the bandwidth measurer 120 measures the bandwidth of a network, connected to a terminal 20, at a set time interval. The time interval may be set to be, for example, one second. However, the examples of the time interval are not limited thereto; in a case in which the bandwidth of the network connected to the terminal 20 changes rapidly, the time interval is set to be short so that the bandwidth measurer 120 may measure the bandwidth; and in a case in which the bandwidth of the network connected to the terminal 20 changes slowly, the time interval is set to be long so that the bandwidth measurer 120 may measure the bandwidth.

In one exemplary embodiment, the segment generator 130 generates a plurality of segments included in each representation by dividing the content at one or more intervals, wherein the plurality of segments have a set bitrate difference Rg from each other. The segment generator 130 generates the plurality of segments included in the representation that divides the content at one or more intervals from the content, which has been read from a content database 110. The content may be divided into multiple representations, and the durations of the representations may be different.

Each representation indicates the structured collection of one or more media components within one interval, and includes a plurality of segments that are encoded at various bitrates. The plurality of segments may have a set bitrate difference Rg from each other. For example, if it is to be assumed that the set bitrate difference Rg may be 500 kbps, and that each of the segments 1 to n included in the representation has a bitrate difference of 500 kbps. Accordingly, the first segment would be 500 kbps; the second segment, 1000 kbps; and the third, 1500 kbps. The examples of the bitrate difference may not be limited thereto and be set variously according to the size, and the like, of the content to be transmitted to the terminal 20.

In one exemplary embodiment, the segment generator 130 calculates the duration of a segment by using four fundamental rules of arithmetic on 1) the probability P(i) of the network bandwidth B(i) becoming bigger by or smaller by half of a set bitrate difference Rg, wherein the network bandwidth B(i) is measured for the i-th time at a set time interval, and 2) the set time interval. Furthermore, the segment generator 130 generates a plurality of segments corresponding to the calculated duration of said segment. DASH-based content may select and transmit, to the terminal 20, a segment, which has the closest bitrate to the bandwidth of a present network, among a plurality of the segments encoded at various bitrates included in a representation to be newly transmitted. The examples of the DASH-based content may not be limited thereto, and may select and transmit, to the terminal 20, a segment, which has the closest bitrate to the bandwidth of the present network, among the segments that include a lower bitrate than the bandwidth of the present network. The time interval may be set to be, for example, one second. However, the examples of the time interval are not limited thereto; in a case in which the bandwidth of the network connected to the terminal 20 changes rapidly, the time interval is set to be short so that the bandwidth may be measured; and in a case in which the bandwidth of the network connected to the terminal 20 changes slowly, the time interval is set to be long so that the bandwidth may be measured.

The segment generator 130 calculates the probability P(i) of the bandwidth B(i) becoming bigger by or smaller by half of a set bitrate difference Rg. Calculating the probability that the bandwidth may become bigger by or smaller by half of the set bitrate difference is essentially the same as calculating the odds of the network bandwidth lying outside the limit of the set bitrate difference. It is mentioned above as each of the plurality of segments that any one representation includes may have the same bitrate difference. In such a case in which the network bandwidth B(i) itself becomes bigger by or smaller by half of the set bitrate difference Rg, selecting the segment, which is bigger or smaller than the bitrate of the present selected segment by the set bitrate difference, leads to selecting the segment encoded at the closest bitrate to the bandwidth of the present network. The time interval may be set to be, for example, one second. However, the examples of the time interval are not limited thereto; in a case in which the bandwidth of the network connected to a terminal 20 changes rapidly, the time interval is set to be short so that the bandwidth may be measured; and in a case in which the bandwidth of the network connected to the terminal 20 changes slowly, the time interval is set to be long so that the bandwidth may be measured.

In one exemplary embodiment, the segment generator 130 calculates the probability P(i) of the network's bandwidth becoming bigger by or smaller by half of the set bitrate difference Rg, wherein the network bandwidth has been measured at a certain point in time, i.e., a present point in time, which would make it the i-th measurement of the bandwidth, by using Chebyshev's inequality.

$$P(|X - \mu| \geq k) \leq \frac{\sigma^2}{k^2} \quad \text{(Equation 1)}$$

Equation 1 is Chebyshev's inequality. Chebyshev's inequality is a probability theorem that states that most values will fall close to the mean in any data sample or any probability distribution, and provides quantitative descriptions on what is meant by the expression "close" and the expression "most". For example, the quantitative descriptions may state, "of the values, one that is more than 2 standard deviations away from the mean is no more than ¼"; "of the values, one that is more than 3 standard deviations away from the mean is no more than ⅑"; and "of the values, one that is more than 5 standard deviations away from the mean is no more than ½5".

Related to Equation 1, it is assumed that there is a random variable X with an expected value μ, and a variance σ2, Equation 1 is established with regard to any real number k that is greater than 0 (i.e., k>0). Equation 1 implies that "the maximum limit of the probability of the measured value X being greater than the mean μ by more than k is the same as the value that is acquired after the variance ρ^2 has been divided by k^2".

In one exemplary embodiment, the segment generator 130 calculates the probability P(i) of the network bandwidth becoming bigger by or smaller by half of a set bitrate difference Rg, wherein the network bandwidth is measured at a certain point in time, i.e., the present point in time, which would make it the i-th measurement of the bandwidth, by using four fundamental rules of arithmetic on the average $B_{avg}(i)$, variance V(i), and set bitrate difference Rg, which have been measured i number of times at a set time interval.

$$P\left(|X - B_{avg}(i)| \geq \frac{R_G}{2}\right) \leq \frac{V(i)}{\left(\frac{R_G}{2}\right)^2} \quad \text{(Equation 2)}$$

Through application of Equation 1 to the present invention, Equation 2 may be acquired. $B_{avg}(i)$ is the average of the bandwidths that have been measured i number of times at a set time interval; V(i) is the variance of the bandwidths that have been measured i number of times at a set time interval; and Rg is a set bitrate difference between segments included in a representation. The interpretation of Equation 2 is that the maximum probability for the bandwidth X, measured for the i-th time, so that X lie outside the present bandwidth average $B_{avg}(i)$ by half of Rg is V(i)/(Rg/2)^2.

Through Equation 2, the probability P(i) of the network bandwidth becoming bigger by or smaller by half of the set bitrate difference Rg may be calculated, wherein the network bandwidth is measured at a certain point in time, i.e., the present point in time, which would make it the i-th measurement of the bandwidth.

$$B_{avg}(i) = xB(i) + (1-x)B_{avg}(i-1) \quad \text{(Equation 3)}$$

$$V(i) = y(B(i) - B_{avg}(i))^2 + (1-y)V(i-1) \quad \text{(Equation 4)}$$

Equation 3 is the average of the bandwidths that are measured i number of times at a set time interval; and Equation 4 is the variance of the bandwidths that are measured ii number of times at a set time interval. The x of Equation 3 and y of Equation 4 are the constants for calculating the average and variance. For example, the x and y may be between 0 and 1. The examples of the equations for calculating the average and variance are not limited to Equations 3 and 4, and various equations for calculating the average and variance may be used.

In one exemplary embodiment, the segment generator 130 calculate the average of the number of measurement times through the probability P(i), wherein the average of the number of measurement times is the average times it takes for the network bandwidth B(i) to become bigger by or smaller by half of the set bitrate difference Rg, wherein the network bandwidth B(i) is measured at a certain point in time, i.e., the present point in time, which would make it the i-th measurement of the bandwidth; and calculates the segment duration by using four fundamental rules of arithmetic on the average of the number of measurement times and the set time interval. In one exemplary embodiment, the segment generator 130 calculates the segment duration by multiplying the average of the number of measurement times and the set time interval. If the maximum probability value V(i)/(Rg/2)^2 from Equation 2 were to be replaced by a desired probability value, Equation 5 may be acquired as below.

$$P(i) = V(i) \Big/ \left(\frac{R_G}{2} - B_{avg}(i)\right)^2 \quad \text{(Equation 5)}$$

If the probability P(i) acquired via Equation 5 is inverted, then the average of the number of measurement times, or 1/P(i), may be calculated, wherein 1/P(i) is the average times it takes for the network bandwidth B(i), measured for the i-th time, to become bigger by or smaller by half of the set bitrate difference Rg. If the average of the number of measurement times 1/P(i) is multiplied by a set time interval $T_{int}$, then this results in $T_{exp}$, which is the average measurement time duration it takes for the network bandwidth B(i), measured for the i-th time, to become bigger by or smaller by half of the set bitrate difference Rg.

$$T_{exp}(i) = T_{int}/P(i) \quad \text{(Equation 6)}$$

Equation 6 calculates the average measurement time duration $T_{exp}$ it takes for the network bandwidth B(i), measured for the i-th time, to become bigger by or smaller by half of the set bitrate difference Rg. For example, 1/P(i) is 3, and the set time interval $T_{int}$ is 2 seconds, this means that it takes a duration of 2 seconds for each measurement, and so the average measurement time duration $T_{exp}$ would be 6 seconds.

An apparatus 10 for providing DASH-based content streams one segment that is included in the representation which is currently being streamed. When a segment of the next representation is to be generated, the segment is generated and streamed to the terminal 20, whereby said generated segment has an average measurement time duration of $T_{exp}$.

In one exemplary embodiment, a media information generator 140 generates media information, also known as 'media presentation description (MPD)', including the information on the representation that includes the plurality of the generated segments. The terms 'media', 'content', and 'media content' may all be used in the same context. Media may refer to, for example, a set of media components, such as a video, audio, and/or subtitles that have an interrelated timeline. Thus, a set of media components may refer to a program or a movie, and such components may have an individual, joint, or mutually exclusive relationship with each other in terms of how they are featured. The MPD may include descriptions for the representations of all the available media to be transmitted to all types of terminals 20. That is, MPD may include the descriptions for the combinations of all available videos, audios, languages, etc. In the process of providing an adaptive streaming service in which HTTP is used, the apparatus 10 transmits the MDP to the terminal 20. For MPD transmission, the media information generator 140 generates the MPD, which includes information regarding representations and their segments, and the terminal 20 receives the MDP. Then, the terminal 20 plays the content based on the MDP.

Figure 2:
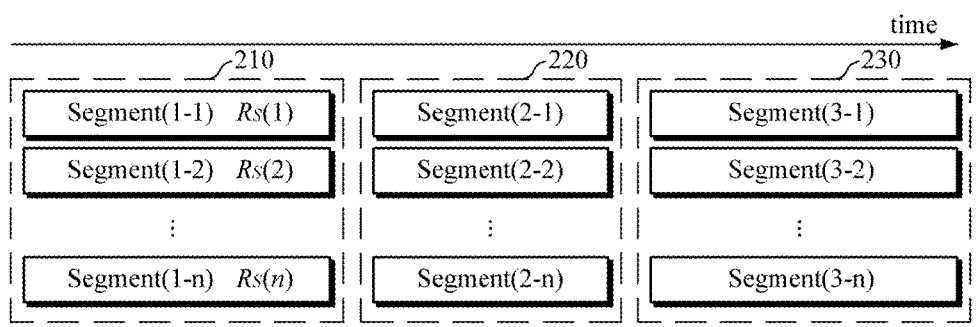
FIG. 2 is a diagram illustrating an example of a plurality of segments included in a representation that divides the content at one or more intervals.

FIG. 2 is a diagram illustrating an example of a plurality of segments included in a representation that divides content at one or more intervals.

As illustrated in FIG. 2, representation 1 210 includes segments 1-1 to 1-n; representation 2 220, segments 2-1 to 2-n; and representation 3 230, segments 3-1 to 3-n. Each of the representations 1 to 3 may have different durations. A representation includes a plurality of segments that are encoded at various bitrates. For example, the segments 1-1 to 1-n that representation 1 includes may have a set bitrate difference Rg. For example, a set bitrate difference Rg may be 500 kbps, whereby each of the first to n-th segments that representation 1 includes has a bitrate difference of 500 kbps. This means that if the first segment is 500 kbps, the second segment is 1000 kbps, and the third segment is 1500 kbps.

Figure 3:
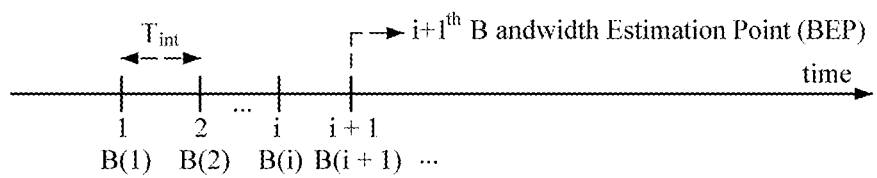
FIG. 3 is a diagram illustrating an example of a point in time when a bandwidth is measured.

FIG. 3 is a diagram illustrating an example of a point in time when a bandwidth is measured.

A bandwidth measurer 120 measures a bandwidth of a network connected to a terminal 20 at a set time interval. The set time interval may be of a consistent duration, e.g., one second. However, the examples of the set are not limited thereto; in a case in which the bandwidth of the network connected to the terminal 20 changes rapidly, the time interval is set to be short so that the bandwidth measurer 120 may measure the bandwidth; and in a case in which the bandwidth of the network connected to the terminal 20 changes slowly, the time interval is set to be long so that the bandwidth measurer 120 may measure the bandwidth.

Figure 4:
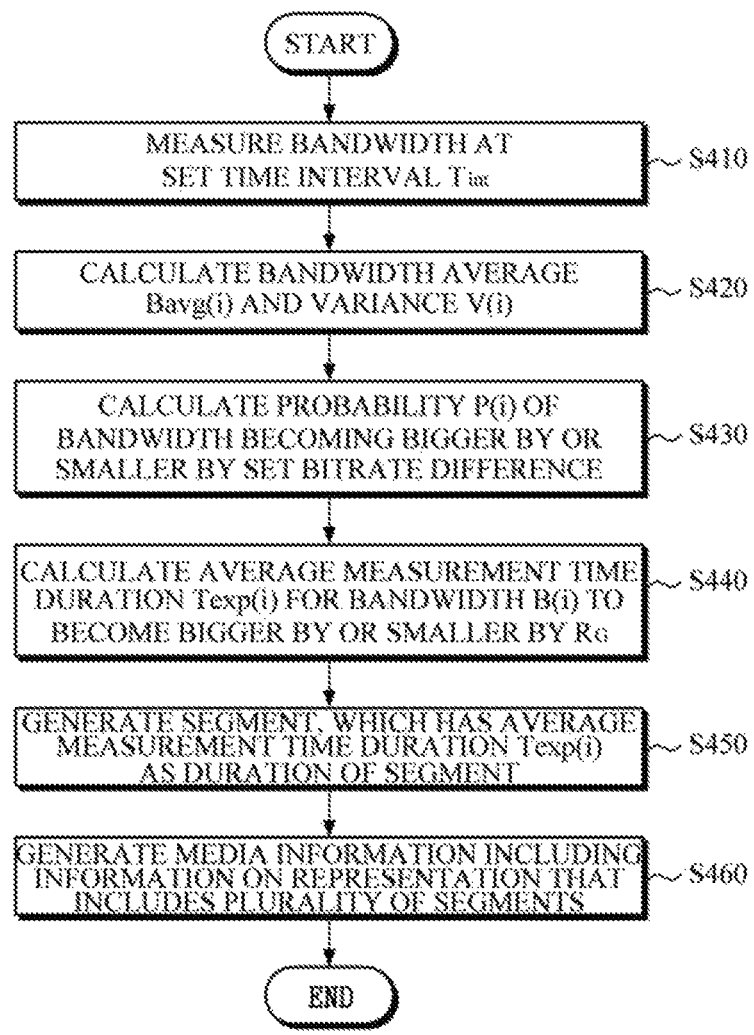
FIG. 4 is a flowchart illustrating a method of providing DASH-based content.

FIG. 4 is a flowchart illustrating a method of providing DASH-based content.

A method of providing DASH-based content includes operations of measuring a bandwidth, generating segments, and generating media information.

In one exemplary embodiment, an operation 410 of measuring a bandwidth includes measuring the bandwidth of the network connected to the terminal at a set time interval. The set time interval may be set to be, for example, one second. However, the examples of the set time interval are not limited thereto; in a case in which the bandwidth of the network connected to the terminal 20 changes rapidly, the time interval is set to be short so that the bandwidth may be measured; and in a case in which the bandwidth of the network connected to the terminal 20 changes slowly, the time interval is set to be long so that the bandwidth may be measured.

In one exemplary embodiment, operation 450 of generating segments includes generating a plurality of segments included in each representation by dividing the content at one or more intervals, wherein the plurality of segments have a set bitrate difference Rg. Operation 450 of generating the segments includes generating the plurality of segments included in the representation that divides the content at one or more intervals, from the content, which has been read from a content data base 110. The content may be divided into multiple representations, and the durations of the representations may be different.

Each representation indicates a structured collection of one or more media components within one interval, and includes a plurality of segments that are encoded at various bitrates. The plurality of segments may have a set bitrate difference Rg from each other. For example, if it is to be assumed that the set bitrate difference Rg may be 500 kbps, and that each of the segments 1 to n included in the representation 1 has a bitrate difference of 500 kbps. Accordingly, the first segment would be 500 kbps, the second segment would be 1000 kbps, and the third segment, 1500 kbps. The examples of the bitrate difference may not be limited thereto and be set variously according to the size, and the like, of the content to be transmitted to a terminal.

In an exemplary embodiment, operation 450 of generating segments includes: calculating the duration of a segment by using fundamental rules of arithmetic on 1) a probability P(i) of the network bandwidth B(i) becoming bigger by or smaller by half of the set bitrate difference Rg, wherein the network bandwidth B(i) is measured for the i-th time at a set time interval; and 2) the set time interval. Furthermore, operation 450 includes generating a plurality of segments corresponding to the calculated duration of said segment. DASH-based content may select and transmit, to a terminal, the segment, which has the closest bitrate to the bandwidth of a present network, among a plurality of segments encoded at various bitrates included in a representation to be newly transmitted. The examples thereof may not be limited thereto, and may select and transmit, to the terminal, the segment, which has the closest bitrate to the bandwidth of the present network, among the segments that include a lower bitrate than the bandwidth of the present network. The set time interval may be set to be, for example, one second. However, the examples of the time interval are not limited thereto; in a case in which the bandwidth of the network connected to the terminal 20 changes rapidly, the time interval is set to be short so that the bandwidth may be measured; and in a case in which the bandwidth of the network connected to the terminal 20 changes slowly, the time interval is set to be long so that the bandwidth may be measured.

The probability P(i) of the network bandwidth B(i) becoming bigger by or smaller by half of a set bitrate difference Rg is calculated in 430. Calculating the probability that the bandwidth may become bigger by or smaller by half of the set bitrate difference is essentially the same as calculating the odds of the network bandwidth lying outside the limit of the set bitrate difference. It is mentioned above as each of the plurality of segments that any one representation includes may have the same bitrate difference. In such a case in which the bandwidth B(i) itself becomes bigger by or smaller by half of the set bitrate difference Rg, selecting the segment, which is bigger or smaller than the bitrate of the present selected segment by the set bitrate difference, leads to selecting the segment encoded at the closest bitrate to the bandwidth of the present network. The time interval may be set to be, for example, one second. However, the examples of the time interval are not limited thereto; in a case in which the bandwidth of the network connected to a terminal 20 changes rapidly, the time interval is set to be short so that the bandwidth may be measured; and in a case in which the bandwidth of the network connected to the terminal 20 changes slowly, the time interval is set to be long so that the bandwidth may be measured.

In one exemplary embodiment, operation 450 includes calculating the probability P(i) of the network bandwidth becoming bigger by or smaller by half of the set bitrate difference Rg, wherein the network bandwidth has been measured at a certain point in time, i.e., a present point in time, which would make it the i-th measurement of the bandwidth, by using Chebyshev's inequality.

$$P(|X-\mu| \geq k) \leq \frac{\sigma^2}{k^2} \qquad \text{(Equation 1)}$$

Equation 1 is a Chebyshev's inequality. Chebyshev's inequality is a probability theorem that states most values will fall close to the mean in any data sample or any probability distribution, and provides quantitative descriptions on what is meant by the expression "close" and the expression "most". For example, the quantitative descriptions may state, "of the values, one that is more than 2 standard deviations away from the mean is no more than $\frac{1}{4}$"; "of the values, one that is more than 3 standard deviations away from the mean" is no more than $\frac{1}{9}$"; "of the values, one that is more than 5 standard deviations away from the mean is no more than $\frac{1}{25}$".

Related to Equation 1, it is assumed that there is a random variable X with an expected value μ, and the variance σ2, Equation 1 is established with regard to any real number k that is greater than 0 (i.e., k>0). Equation 1 implies that "the maximum limit of the probability of the measured value X being greater than the mean μ by more than k is the same as the value that is acquired after the variance σ^2 has been divided by k^2".

In one exemplary embodiment, operation 450 includes calculating the probability P(i) of the network bandwidth itself becoming bigger by or smaller by half of a set bitrate difference Rg, wherein the network bandwidth is measured at a certain point in time, i.e., the present point in time, which would make it the i-th measurement of the bandwidth by using four fundamental rules of arithmetic on the average $B_{avg}(i)$, variance V(i), and set bitrate difference Rg, which have been measured i number of times at a set time interval.

$$P\left(|X - B_{avg}(i)| \geq \frac{R_G}{2}\right) \leq \frac{V(i)}{\left(\frac{R_G}{2}\right)^2} \qquad \text{(Equation 2)}$$

Through application of Equation 1 to the present invention, Equation 2 may be acquired. $B_{avg}(i)$ is the average of the bandwidths that have been measured the i number of times at a set time interval; V(i) is the variance of the bandwidths that have been measured i number of times at a set time interval; and Rg is a set bitrate difference between segments included in a representation. The interpretation of Equation 2 is that the maximum probability for the bandwidth X, measured for the i-th time, so that X lie outside the present bandwidth average $B_{avg}(i)$ by half of Rg is v(i)/(Rg/2)^2. Through Equation 2, the probability P(i) of the network bandwidth itself becoming bigger by or smaller by half of the set bitrate difference Rg may be calculated, wherein the network bandwidth is measured at a certain point in time, i.e., the present point in time, which would make it the i-th measurement of the bandwidth.

$$B_{avg}(i)=xB(i)+(1-x)B_{avg}(i-1) \qquad \text{(Equation 3)}$$

$$V(i)=y(B(i)-B_{avg}(i))^2+(1-y)V(i-1) \qquad \text{(Equation 4)}$$

Equation 3 is the average of the bandwidths that are measured i number of times at a set time interval; and Equation 4 is the variance of the bandwidths that are measured i number of times at a set time interval. The x of Equation 3 and y of Equation 4 are the constants for calculating the average and variance. For example, the x and y may be between 0 and 1. The examples of the equations for calculating the average and variance are not limited to Equations 3 and 4, and various equations for calculating the average and variance may be used.

In one exemplary embodiment, operation 450 includes: calculating the average of the number of measurement times through the probability P(i), wherein the average of the number of measurement times is the average times it takes for the network bandwidth B(i) to become bigger by or smaller by half of the set bitrate difference Rg, wherein the network bandwidth B(i) is measured at a certain point in time, i.e., the present point in time which would make it the i-th measurement of the bandwidth; and calculating the segment duration by using four fundamental rules of arithmetic on the average of the number of measurement times and the set time interval. In one exemplary embodiment, operation 450 includes calculating the segment duration by multiplying the average of the number of measurement times and the set time interval. If the maximum probability value V(i)/(Rg/2)^2 from Equation 2 were to be replaced by a desired probability value, Equation 5 may be acquired as below.

$$P(i) = V(i) \Big/ \left(\frac{R_G}{2} - B_{avg}(i)\right)^2 \qquad \text{(Equation 5)}$$

If the probability P(i) acquired via Equation 5 is inverted, then the average of the number of times, or 1/P(i), may be calculated, wherein 1/P(i) is the average times it takes for the network bandwidth B(i), measured for i-th time, to become bigger by or smaller by half of the set bitrate difference Rg. If the average of the number of measurement times 1/P(i) is multiplied by a set time interval $T_{int}$, then this results in $T_{exp}$, which is the average measurement time duration it takes for the network bandwidth B(i), measured for the i-th time, to become bigger by or smaller by half of the set bitrate difference Rg.

$$T_{exp}(i)=T_{int}/P(i) \qquad \text{(Equation 6)}$$

Equation 6 calculates the average measurement time duration $T_{exp}$ it takes for the network bandwidth B(i), measured for the i-th time, to become bigger by or smaller by half of the set bitrate difference Rg. For example, 1/P(i) is 3, and the set time interval $T_{int}$ is 2 seconds, this means that it takes a duration of 2 seconds for each measurement, and so the average measurement time duration $T_{exp}$ would be 6 seconds.

A method of providing DASH-based content streams one segment that is included in the representation which is currently being streamed. When the segment of the next representation is to be generated, the segment is generated and streamed to the terminal, whereby said generated segment has an average measurement time duration of $T_{exp}$.

In one exemplary embodiment, operation 460 includes generating media information, also known as 'media presentation description (MPD)', including the information on the representation that includes the plurality of the generated segments. The terms 'media', 'content', and 'media content' may all be used in the same context. Media may refer to, for example, a set of media components, such as a video, audio, and/or subtitles that have an interrelated timeline. Thus, a set of media components may refer to a program or a movie, and such components may have an individual, joint, or mutually exclusive relationship with each other in terms of how they are featured. The MPD may include descriptions for the representations of all the available media to be transmitted to all types of terminals 20. That is, MPD may include the descriptions for the combinations of all available videos, audios, languages, etc. In the process of providing an adaptive streaming service in which HTTP is used, the method of providing DASH-based content includes transmitting the MPD to the terminal 20. For the MPD transmission, operation 460 includes generating the MDP, which includes information regarding representations and their segments, and the terminal 20 receives the MPD. Then, the terminal 20 plays the content based on the MPD.

While the present invention has been described with reference to embodiments illustrated in appended drawings, it will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

The invention claimed is:

1. An apparatus for providing dynamic adaptive streaming over HTTP (DASH)-based contents, the apparatus comprising:
 a bandwidth measurer configured to measure a network bandwidth at a set time interval;
 a segment generator configured to generate a plurality of segments included in a representation that divides a content at one or more intervals; and
 a media information generator configured to generate media information, the media information comprising information on the representation that includes a plurality of segments,
 wherein the segment generator is further configured to adjust a duration of the segments according to a change in the network bandwidth measured at the set time interval by calculating the duration of the segments based on the set time interval for measuring the network bandwidth and a probability that the network bandwidth varies by more than 50% of a set bitrate difference.

2. The apparatus of claim 1, wherein the plurality of segments are encoded at a same bit rate or encoded at different bit rates.

3. The apparatus of claim 1, wherein the probability that the network bandwidth varies by more than 50% of a set bitrate difference is calculated using Chebyshev's inequality.

4. The apparatus of claim 1, wherein the segment generator is further configured to calculate a probability that a network bandwidth which is measured at a certain point in time, which makes an i-th measurement of the bandwidth, becomes higher by or lower by 50% of the set bitrate difference, by using arithmetic operations on an average of network bandwidth measurements, a variance of network bandwidth measurements, and the set bitrate difference, the network bandwidth being measured i number of times at the set time interval.

5. The apparatus of claim 1, wherein the segment generator is further configured to:
 calculate an average number of measurement times based on the probability that the network bandwidth varies by more than 50% of a set bitrate difference, wherein the average number of measurement times is an average number of measurement times that it takes for a network bandwidth which is measured at a certain point in time, which makes an i-th measurement of the bandwidth, to become higher by or lower by half of the set bitrate difference; and
 calculate the duration of the segments by using arithmetic operations on the average number of measurement times and the set time interval.

6. The apparatus of claim 1, wherein the segment generator is configured to:
 calculate an average number of measurement times based on the probability that the network bandwidth varies by more than 50% of a set bitrate difference, wherein the average number of measurement times is an average number of measurement times that it takes for a network bandwidth which is measured at a certain point in time, which makes an i-th measurement of the bandwidth, to become higher by or lower by half of the set bitrate difference; and
 calculate the duration of the segments by multiplying the average number of measurement times and the set time interval.

7. The apparatus of claim 1, wherein the representation indicates a structured collection of one or more media components within an interval.

8. The apparatus of claim 1, wherein the set time interval for measuring the network bandwidth is adjusted in accordance with a change rate of the network bandwidth.

9. The apparatus of claim 1, wherein the segment generator is configured to set the duration of the segments to be shorter as the change in the network bandwidth increases.

10. A method of providing dynamic adaptive streaming over HTTP (DASH)-based contents, the method comprising:
 measuring a network bandwidth at a set time interval;
 generating a plurality of segments included in a representation that divides a content at one or more intervals; and
 generating media information, the media information comprising information on the representation that includes a plurality of segments,
 wherein the generating the plurality of segments comprises adjusting a duration of the segments according to a probability of a change in the network bandwidth measured at the set time interval by calculating the duration of the segments based on the set time interval for measuring the network bandwidth and a probability that the network bandwidth varies by more than 50% of a set bitrate difference.

11. The method of claim 10, wherein the plurality of segments are encoded at a same bit rate or encoded at different bit rates.

12. The method of claim 10, wherein the probability that the network bandwidth varies by more than 50% of a set bitrate difference is calculated using Chebyshev's inequality.

13. The method of claim 10, wherein the generating the plurality of segments further comprises calculating a probability that a network bandwidth which was is measured at a certain point in time, which makes an i-th measurement of the bandwidth, becomes higher by or lower by 50% of the set bitrate difference, by using arithmetic operations on an average of network bandwidth measurements, a variance of network bandwidth measurements, and the set bitrate difference, the network bandwidth being measured i number of times at the set time interval.

14. The method of claim 10, wherein the generating the plurality of segments further comprises:
calculating an average number of measurement times based on the probability that the network bandwidth varies by more than 50% of a set bitrate difference, wherein the average number of measurement times is an average number of measurement times that it takes for a network bandwidth which is measured at a certain point in time, which makes an i-th measurement of the bandwidth, to become higher by or lower by half of the set bitrate difference; and
calculating the duration of the segments by using arithmetic operations on the average number of measurement times and the interval time.

15. The method of claim 10, wherein the generating the plurality of segments comprises:
calculating an average number of measurement times based on the probability that the network bandwidth varies by more than 50% of a set bitrate difference, wherein the average number of measurement times is an average number of measurement times that it takes for a network bandwidth which is measured at a certain point in time, which makes an i-th measurement of the bandwidth, to become higher by or lower by half of the set bitrate difference; and
calculating the duration of the segments by multiplying the average number of measurement times and the set time interval.

16. The method of claim 10, wherein the representation indicates a structured collection of one or more media components within an interval.

17. The method of claim 10, wherein the set time interval for measuring the network bandwidth is adjusted in accordance with a change rate of the network bandwidth.

18. The method of claim 10, wherein the duration of the segments is set to be shorter as the change in the network bandwidth increases.

* * * * *